3,311,028
ROLLING DIAPHRAGM DEVICE WITH ROLLING DIAPHRAGM HAVING CLAMPING BEAD AND RESILIENT CLAMPING MEANS FOR THE BEAD
John F. Taplin, 15 Sewall St., West Newton, Mass. 02165
Filed July 26, 1966, Ser. No. 568,069
5 Claims. (Cl. 92—99)

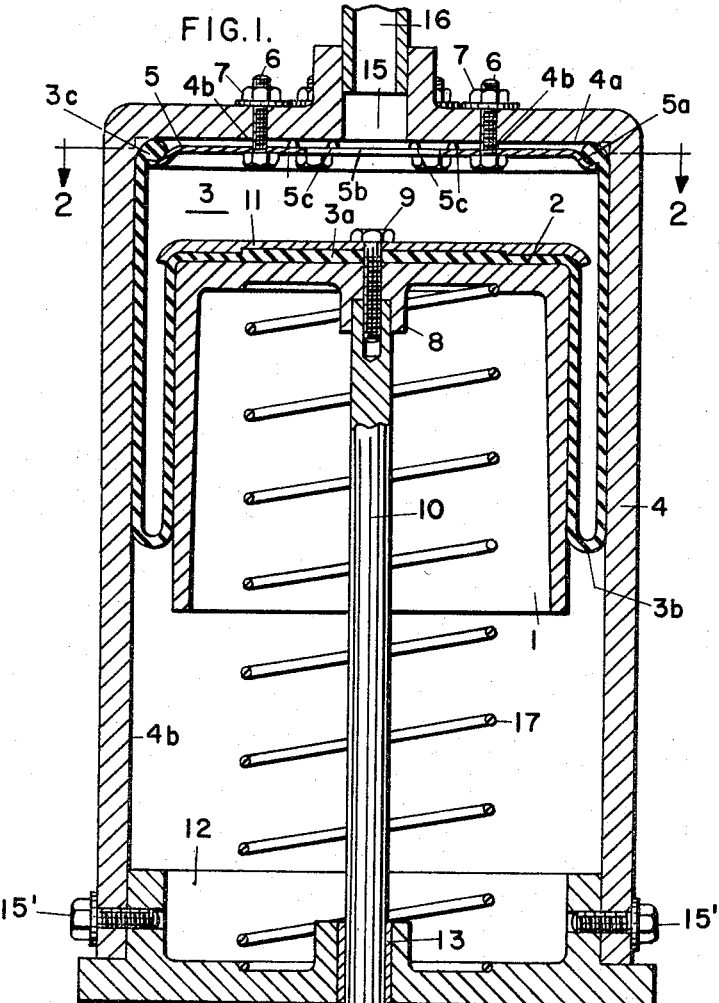
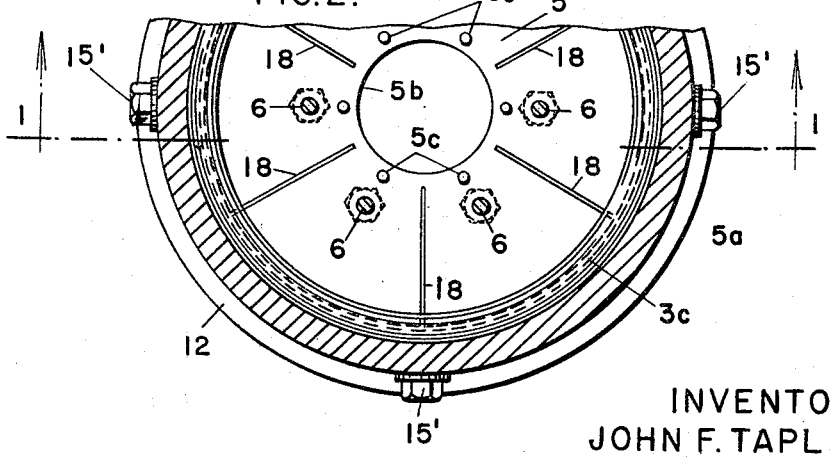

This is a continuation-in-part of my copending patent application Ser. No. 437,008, filed Mar. 1, 1965, for Rolling Diaphragm Device Avoiding Leakage Joint, now abandoned.

This invention relates to rolling diaphragm devices including a movable piston such as, for instance, piston pumps, or piston actuators.

This invention relates more particularly to rolling diaphragm devices whose rolling diaphragms include annular clamping beads for securing the rolling diaphragm to the stationary portion or fixed cylinder body of the rolling diaphragm device.

It is one object of this invention to provide improved rolling diaphragm devices having improved and simple means for securing the clamping bead of the rolling diaphragm to the cylinder body of the rolling diaphragm device.

Rolling diaphragm devices wherein the rolling diaphragm is clamped to the cylinder body of the device by means of an annular clamping bead require particular consideration in regard to the clamping pressure acting upon the clamping bead. In instances where a rolling diaphragm is provided with a relatively wide radially outer clamping flange the amount of clamping pressure applied is not critical, and may vary within relatively wide limits, without injury to the rolling diaphragm. The situation is, however, quite different in instances involving rolling diaphragms having annular relatively narrow clamping beads rather than radially outer relatively wide clamping flanges. Annular clamping beads require prescribed clamping pressures which are relatively critical, i.e. which admit either way but small tolerances. In other words, relatively slight deviations from the prescribed clamping pressure may result in permanent injury to the rolling diaphragm.

It is, therefore, another object of this invention to provide improved rolling diaphragm devices including rolling diaphragms having relatively narrow annular clamping beads which devices allow to readily apply just the right clamping pressure upon the clamping beads and exert a resilient rather than an unyielding pressure upon the same.

Other objects of the invention and advantages thereof will become apparent from the following detailed description of a preferred embodiment of the invention, and from the accompanying drawings, in which:

FIG. 1 is a longitudinal section of a rolling diaphragm device embodying the present invention taken along 1—1 of FIG. 2; and FIG. 2 is a sectional view of the structure of FIG. 1 taken along 2—2 of FIG. 1, the rear portion of the structure being broken away.

Referring now to the drawings, numeral 1 has been applied to indicate a movable piston having an end surface 2. The rolling diaphragm generally indicated by reference numeral 3 comprises a radially inner clamping flange 3a, a convoluted rolling wall 3b and an annular clamping bead 3c. The structure further comprises a cylinder body and a bonnet, said cylinder body and said bonnet being formed of a single integral piece of material to which reference numeral 4 has been applied. Part 4 has an inner flat end surface 4a which has a plurality of eccentrically arranged angularly displaced axially extending holes 4b. Annular plate 5 is arranged inside the cylindrical space defined by part 4 juxtaposed in substantially parallel relation to the end surface 4a thereof. Annular plate 5 has an axially outer periphery 5a engaging clamping bead 3c of rolling diaphragm 3. Reference numeral 6 has been applied to indicate a plurality of angularly displaced screw-threaded studs each projecting through one of holes 4b. Each screw-threaded stud 6 has an axially inner end permanently secured to annular plate 5 to preclude any relative movement between studs 6 and annular plate 5 and to constitute studs 6 and annular plate 5 an integral sub-assembly unit. To form such a unit the axially inner ends of studs 6 are preferably projection-welded to annular plate 5, causing each of studs 6 to be moved into its respective hole 4b whenever annular plate 5 is placed into position. A plurality of screw-nuts 7 is mounted on the axially outer ends of studs 6. The function of studs 6 and nuts 7 is to exert clamping pressure upon annular plate 5 and upon annular clamping bead 3c of rolling diaphragm 3. Since the function of studs 6 and nuts 7 is to exert the proper clamping pressure on annular bead 3c, nuts 7 may be tightened just to the right extent required to exert the proper amount of clamping pressure upon annular clamping bead 3c. Studs 6 and nuts 7 are the only means present in the structure clamping annular plate 5 against annular bead 3c. Sleeve 8 is integral with piston 1 and may be a separate part projection-welded to the inner surface of piston 1. Screw 9 projects through the end surface 2 of piston 1 into piston rod 10. Screw 9 clamps the clamping plate 11 for the radially inner clamping flange 3a of rolling diaphragm 3 against the end surface 2 of piston 1 and further secures piston rod 10 to piston 1. The lower end of part 4 is closed by a bottom part 12 forming a bearing 13 for piston rod 10. Parts 4 and 12 are firmly held in position by screws 15' projecting transversely through them.

The flat inner end surface 4a of part 4 is provided with a fluid duct to which fluid pipe 16 is connected as, for instance, by soldering.

It will be observed that rolling diaphragm 3 may readily be replaced upon removal of bottom part 12 and untightening of screw nuts 7 without affecting the connection of the rolling diaphragm device with the fluid system or systems with which it is associated, i.e. without affecting the connection between duct 15 and pipe 16 and, vice versa, removal of pipe 16 from the rolling diaphragm device does not affect the clamping mechanism for the annular clamping bead 3c.

The rolling diaphragm device shown may be used as an actuator. If it is intended to be used as a piston pump, a pair of fluid ducts must be substituted for the single fluid duct 15 shown, and each of that pair of fluid ducts controlled by one of a pair of check valves, one of said pair of check valves being open only during the suction stroke of piston 1, and the other of said pair of check valves being open only during the compression stroke of piston 1.

Reference numeral 17 has been applied to indicate a helical spring biasing piston 1 in up-stroke direction. FIG. 1 shows the constituent elements of the rolling diaphragm device close to the up-stroke position. During the movement of piston 1 to the full up-stroke position spring 17 expands and the rolling wall 3b of diaphragm 3 rolls off part 4 and upon the lateral wall of piston 1. During the down-stroke of piston 1 spring 17 is compressed and the rolling wall of diaphragm 3 rolls off piston 1 and upon the lateral wall of part 4. It will be noted that parts 1 and 4 define a toroidal gap space wherein the rolling wall 3b of rolling diaphragm 3 is accommodated.

Rolling diaphragm 3 is preferably of the composite type including a woven insert and a layer of an elastomer, e.g. synthetic rubber. Such rolling diaphragms and the method of manufacturing the same are disclosed and claimed in U.S. Patent 2,849,026 to John F. Taplin, Aug. 26, 1958, for Flexible Fluid Sealing Diaphragm.

It will further be apparent from the foregoing that cylinder body and bonnet 4 and piston 1 have a common longitudinal axis, and that the internal lateral cylindrical wall 4b of cylinder body and bonnet 4 defines at the locus of intersection with the internal substantially flat inner end surface 4a of cylinder body and bonnet 4 a substantially circular edge. Annular bead 3c of rolling diaphragm 3 is arranged substantially at said circular edge. Annular plate 5 extending substantially parallel to flat surface 4a forms a resilient cantilever-type clamping means for clamping annular clamping bead 3c against the aforementioned circular edge. Clamping means 6, 7 which are fixedly secured to flat end surface 4a are arranged relatively close to the longitudinal axis of cylinder body 4 and piston 1, and the radially outer end or periphery 5a of annular plate 5 engaging bead 3c is flexible relative to the flat inner end surface 4a. To be more specific, annular plate 5 is made of a flexible material (metal) sufficiently thin to allow bending of the radially outer bead-engaging periphery 5a thereof relative to the radially inner periphery 5b thereof. This resilient bending of annular plate 5 occurs under the action of the downward thrust exerted by bead 3c against the outer periphery 5a of annular plate 5.

Annular plate 5 may be provided with a plurality of angularly displaced radially extending narrow slots 18 to increase the flexibility thereof. In other words, annular plate 5 may have performance characteristics similar to those of a Belleville washer. The length of slots 18 is less than the difference between the radius of the outer periphery 5a of plate 5 and the radius of the inner periphery 5b of plate 5. As a result, plate 5 is not subdivided into a plurality of separate sectors, but forms an integral structural unit. The width of slots 18 ought to be as small as possible in order to subject substantially the entire circumference of clamping bead 3c to the required clamping pressure.

Screw threaded studs 6 are arranged along lines bisecting the angles enclosed between contiguous slots 18. Annular plate 5 may further be provided with local abutments or projections 5c projecting out of the general plane of plate 5 and engaging the inner surface 4a of cylinder body 4. Abutments 5c are arranged along the same lines bisecting the angles between contiguous slots 18 as studs 6, but are situated closer to the longitudinal axis of cylinder body 4 than studs 6. It will thus be apparent that plate 5 forms, in effect, an infinite number of radially extending resilient cantilevers each having a radially inner relatively short and relatively inflexible arm, and each having a highly flexible arm whose outer end engages bead 3c.

Preparatory to assembling the structure of FIGS. 1 and 2 clamping flange 3a of rolling diaphragm 3 is clamped by means of clamping plate 11 and screw 9 against end surface 2 of piston 1 and annular plate 5 is placed upon clamping plate 11 with clamping bead 3c of rolling diaphragm 3 in position on the appropriately bent outer periphery of annular plate 5. Thereafter annular plate 5 and piston 1 are jointly inserted into cylinder body and bonnet 4, piston rod 10 being used to move annular plate 5 to its normal position shown in FIG. 1. The initial insertion of piston 1 with annular plate 5 resting on the clamping plate 11 of piston 1 into cylinder body or bonnet 4 is effected in such a way that studs 6 are in registry with holes 4b in end surface 4a. Registry between these parts is maintained while annular plate 5 and bead 3 are pushed upward into cylinder and bonnet 4. As a result, studs 6 project through holes 4b when annular plate 5 reaches its normal position shown in FIG. 1, and screw-nuts 7 may then readily be mounted on studs 6. When rolling diaphragm 3 needs replacement, annular plate 5 and rolling diaphragm 3 may readily be removed from cylinder body and bonnet 4 upon removal of screw-nuts 7 from studs 6 by exerting a downward pull upon piston rod 10. Replacing of a damaged rolling diaphragm 3 by a new one is effected in exactly the same way as the original installation of a rolling diaphragm 3 in cylinder body and bonnet 4.

Having described my invention what I claim and desire to secure by Letters Patent is:

1. A rolling diaphragm device comprising:
   (a) a cylinder body having a longitudinal axis and having an internal cylindrical lateral wall surface and having an internal substantially flat inner end surface, said internal cylindrical lateral wall surface and said substantially flat inner end surface defining a substantially circular edge at the locus of intersection thereof;
   (b) a reciprocable piston coaxially arranged inside said cylinder body having an external cylindrical lateral wall surface spaced from said internal cylindrical lateral wall surface of cylinder body, said lateral wall surface of said cylinder body and said lateral wall surface of said piston defining a toroidal space;
   (c) a rolling diaphragm having a radially inner portion secured to said piston, a rolling wall forming a convolution arranged inside said toroidal space and an annular clamping bead arranged substantially at said circular edge at said locus of intersection of said lateral surface of said cylinder body and said end surface thereof; and
   (d) resilient cantilever-type clamping means for said annular clamping bead of said rolling diaphragm extending substantially parallel to said flat inner end surface of said cylinder body, said clamping means being fixedly secured to said substantially flat inner end surface of said cylinder body at points relatively close to said longitudinal axis thereof and having radially outer flexible ends cooperatively engaging said annular bead of said rolling diaphragm and being flexed relative to said flat inner end surface of said cylinder body by virtue of the thrust imparted to said radially outer flexible ends of said clamping means by said annular bead of said rolling diaphragm.

2. A rolling diaphragm device as specified in claim 1 wherein said clamping means is formed by an annular plate fixedly secured adjacent the inner periphery thereof to said flat inner end surface of said cylinder body and in physical engagement adjacent the outer periphery thereof with said annular bead of said rolling diaphragm, said annular plate being of a flexible material and being sufficiently thin to allow bending of said outer periphery thereof relative to said inner periphery thereof under the action of pressure exerted by said annular bead of said rolling diaphragm against said outer periphery of said annular plate.

3. A rolling diaphragm device as specified in claim 1 wherein said clamping means is formed by an annular plate fixedly secured adjacent the inner periphery thereof to said flat inner end surface of said cylinder body and in physical engagement adjacent the outer periphery thereof with said annular bead of said rolling diaphragm, said annular plate being of a flexible material and being sufficiently thin to allow bending of said outer periphery thereof relative to said inner periphery thereof under the action of pressure exerted by said annular bead of said rolling diaphragm against said outer periphery of said annular plate, said annular plate being provided with a plurality of angularly displaced radially extending narrow slots to increase the flexibility thereof, the length of said slots being less than the difference between the radius of the outer periphery of said annular plate and the radius of said inner periphery thereof.

4. A rolling diaphragm device as specified in claim 1 wherein said clamping means is formed by an annular plate fixedly secured adjacent the inner periphery thereof to said flat inner end surface of said cylinder body and in physical engagement adjacent the outer periphery thereof with said annular bead of said rolling diaphragm, said annular plate being of a flexible material and being sufficiently thin to allow bending of said outer periphery thereof relative to said inner periphery thereof under the action of pressure exerted by said annular bead of said rolling diaphragm against said outer periphery of said annular plate, said annular plate being provided with a plurality of angularly displaced radially extending narrow slots to increase the flexibility thereof, the length of said slots being less than the difference between the radius of the outer periphery of said annular plate and the radius of said inner periphery thereof, said annular plate being secured to said inner end surface of said cylinder body by screws arranged along lines bisecting the angles enclosed between contiguous said slots, said annular plate being provided with local abutments projecting out of the general plane of said annular plate, engaging said inner end surface of said cylinder body and being arranged along said lines bisecting said angles between contiguous said slots at points closer to the longitudinal axis of said cylinder body than said screws for securing said annular plate to said inner end surface of said cylinder body.

5. A rolling diaphragm device as specified in claim 1 wherein said clamping means is formed by an annular plate fixedly secured adjacent the inner periphery thereof to said flat inner end surface of said cylinder body and in physical engagement adjacent the outer periphery thereof with said annular bead of said rolling diaphragm, said annular plate being of a flexible material and being sufficiently thin to allow bending of said outer periphery thereof relative to said inner periphery thereof under the action of pressure exerted by said annular bead of said rolling diaphragm against said outer periphery of said annular plate, a plurality of screw-threaded studs welded to said annular plate projecting transversely through said inner end surface of said cylinder body for securing said annular plate to said inner end surface of said cylinder body.

References Cited by the Examiner
UNITED STATES PATENTS

| | | | |
|---|---|---|---|
| 2,478,575 | 8/1949 | Fitch | 92—98 |
| 2,577,613 | 12/1951 | Friberg | 92—98 |
| 2,761,427 | 9/1956 | Shumaker | 92—98 X |
| 3,082,792 | 3/1963 | Jenkins | 92—101 X |

MARTIN P. SCHWADRON, *Primary Examiner.*

I. C. COHEN, *Assistant Examiner.*